(12) United States Patent
Wan

(10) Patent No.: US 6,488,413 B1
(45) Date of Patent: Dec. 3, 2002

(54) GATING SYSTEM FOR HIGH PRECISION MOLDING

(75) Inventor: Xiao Yang Wan, El Paso, TX (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/329,121

(22) Filed: Jun. 9, 1999

(51) Int. Cl.[7] ................................................ G02B 6/36

(52) U.S. Cl. ........................................ 385/78; 385/147

(58) Field of Search ............................. 385/78, 84, 85, 385/147

(56) References Cited

U.S. PATENT DOCUMENTS

| | | | | |
|---|---|---|---|---|
| 4,722,584 A | * | 2/1988 | Kakii et al. | 350/96.2 |
| 4,729,624 A | * | 3/1988 | Kakii et al. | 350/96.2 |
| 5,568,581 A | * | 10/1996 | Johnson et al. | 385/78 |

OTHER PUBLICATIONS

Bayer AG Product Information Sheet, *Processing Data for the Injection Moulder,* 1989, p. 24.
AG Technology, *Gate Design—Table 6–1,* 1994–1996, p. 65.

* cited by examiner

*Primary Examiner*—Michael P. Stafira

(57) ABSTRACT

A system is described for precise injection molding and creation of fiber optic plastic ferrules or other molded parts. In a described application, a molded plastic part is formed that yields four ferrules. The plastic part has a central hub from which four arms extend, each having a ferrule-carrying portion. The mold has a pair of interengageable halves that mate to form a series of channels and gates for formation of the plastic part. Molten plastic flows from a central chamber through the channels. From each channel, the molten plastic then flows into a fan-shaped gate, a ring-shaped gate and an annular parabolic-shaped gate and finally into a molding chamber for molding the tubular ferrule. The molten plastic is temporarily accumulated by the gating system and then flows into the molding chamber in an evenly distributed manner.

19 Claims, 9 Drawing Sheets

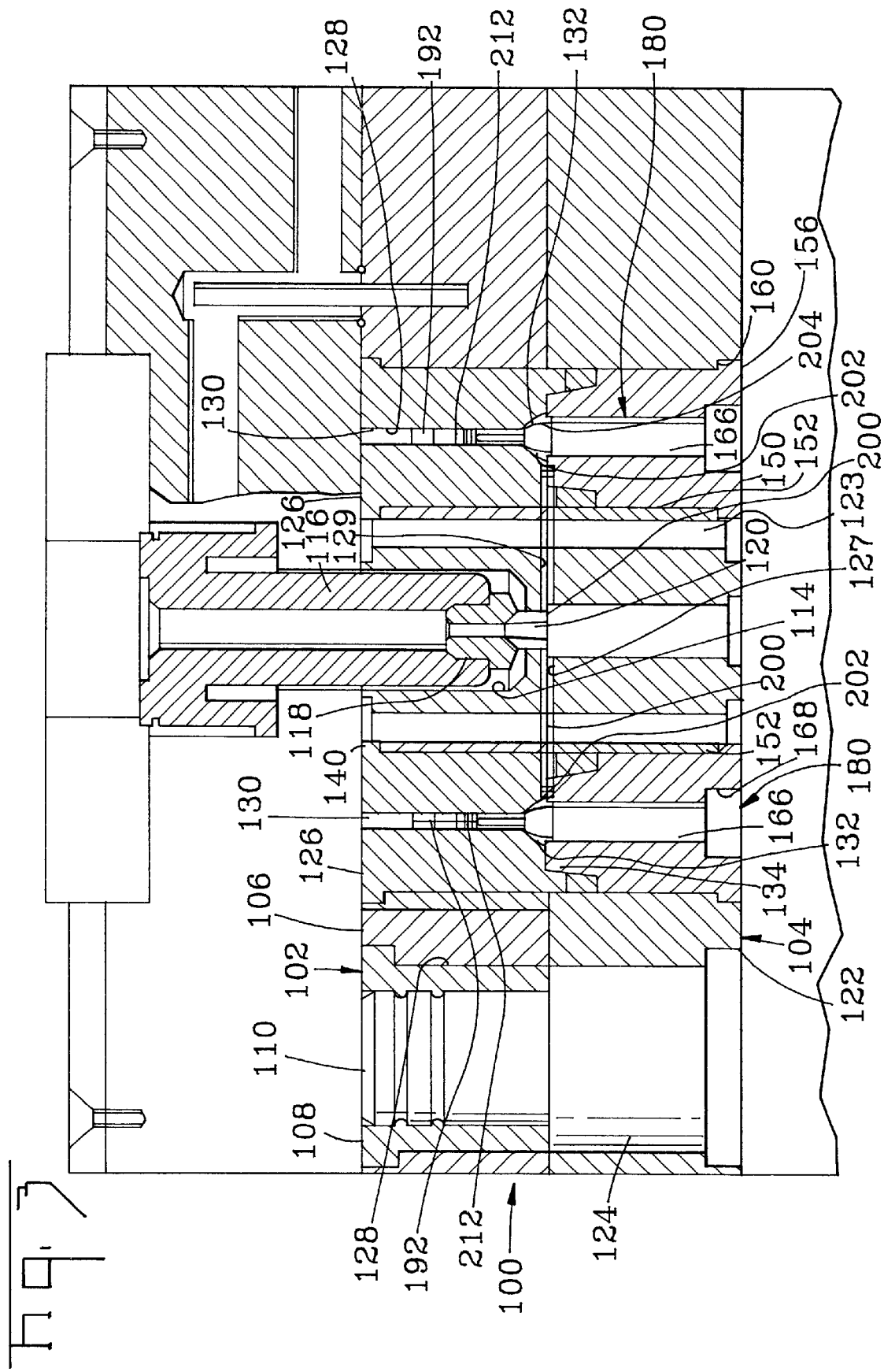

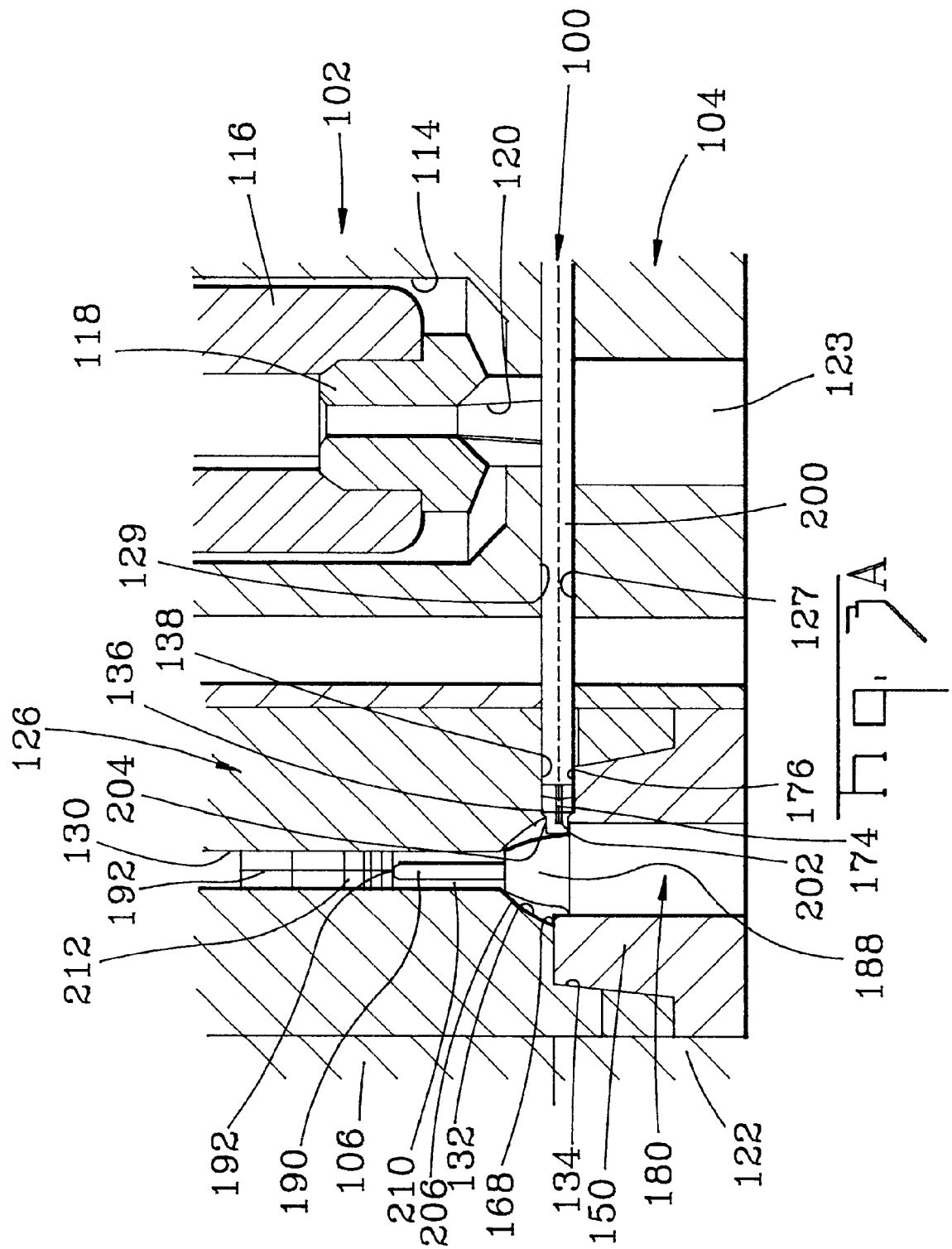

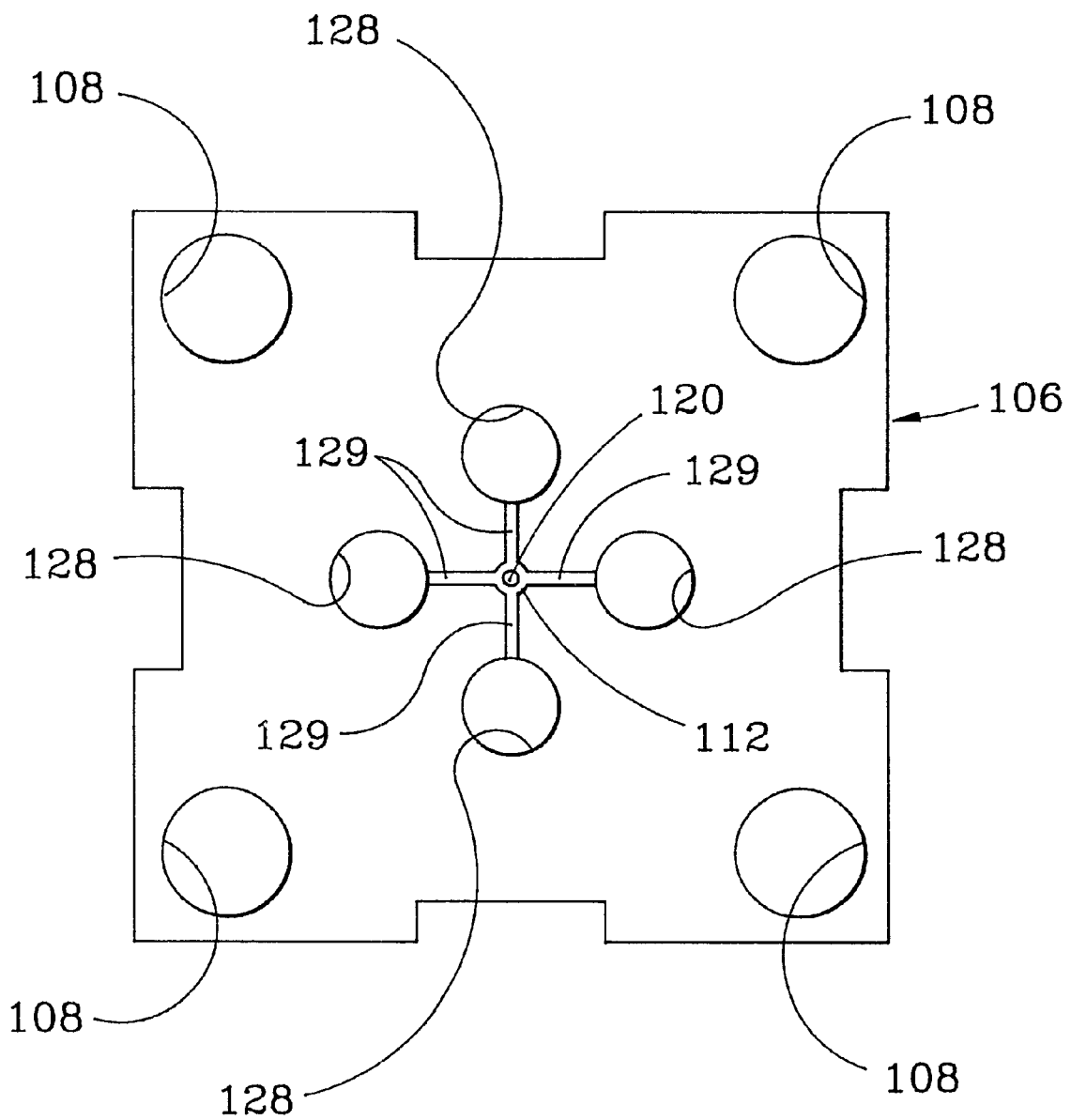
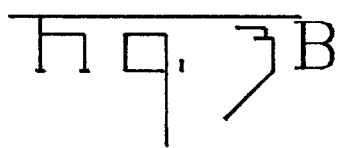

GATING SYSTEM FOR HIGH PRECISION MOLDING

BACKGROUND

The present invention is directed to systems for the injection molding of plastic parts. In particular aspects, the invention is directed to a gating system useful in the molding process for creating optical fiber ferrules.

A fiber optic ferrule is a tubular member that receives the end of an optical fiber or fibers and is then abutted against an opposing ferrule in order to precisely align the fibers so that an optical signal can be transmitted between them. FIGS. 1 and 1A of the drawings depict an exemplary ferrule 10 of a type that is known in the art. As shown there, the ferrule 10 has a generally cylindrical body 12 having ends 14 and 16. The first end 14 has a reduced diameter portion 18 that is adapted to retain a sleeve (not shown) to form an abutting connection with a like ferrule.

The cylindrical body 12 also defines a pair of concentric bores 20 and 22 therewithin. The first bore 20 has a large diameter with an opening 24 at one end of the body 12. The first bore 20 may be slightly tapered along its length. The second bore 22 has a reduced diameter with an opening 26 at the other end of the body 12. The diameter of the second bore 22 is very small—on the order of 0.02 mm.

Ferrules are typically formed of a polymer or other plastic and are created by injection molding. In order to operate properly, ferrules must be fashioned with great precision. The allowable tolerances for these components are typically only a few microns. Therefore, the details of the molding process must be carefully controlled. Conventional injection molding processes, however, often result in uneven plastic flow patterns and high failure rates. Improved molding processes and systems are desired. Also, even with ferrules that meet specifications, the amount of discarded polymer to usable polymer is high.

SUMMARY OF THE INVENTION

The present invention describes devices and methods for the precise molding and creation of ferrules or other plastic parts. In the exemplary embodiment described herein, a molded plastic part is formed that yields four ferrules. The plastic part has a central hub from which four arms extend, each having a ferrule-carrying portion.

A mold is described for molding the plastic part. The mold has a pair of interengageable halves that mate to form a novel series of runners and gates for formation of the plastic part. When molten plastic is injected into the mold, the runners and gates provide for improved plastic flow to form the ferrule-carrying portions of the part. In the described embodiment, molten plastic is flowed from a central chamber through four substantially cylindrical channels. From each channel, the molten plastic then flows into a fan-shaped gate, a ring gate and a parabolic gate. The molten plastic is temporarily accumulated by the gating system and then flowed into a ferrule molding chamber in an evenly distributed manner.

It is to be understood that both the foregoing general description and the following detailed description are exemplary and explanatory only and are not restrictive of the invention as claimed.

The following drawings, which are incorporated in and constitute a part of this specification, illustrate several embodiments of the invention and, together with the description, serve to explain the principles of the invention.

BRIEF DESCRIPTION OF THE DRAWINGS

FIG. 1A is an isometric view of the ferrule shown in FIG. 1.

FIG. 3 is a partial cross-sectional view of an exemplary mold for injection molding of the plastic part shown in FIGS. 2 and 2A.

FIG. 3A is an enlarged partial cross-sectional view of some of the components shown in FIG. 3.

FIG. 3B is a simplified bottom view of an exemplary A-side mold plate.

FIG. 5 is an isometric view of an exemplary B-side mold insert with a core pin assembly disposed within it.

DETAILED DESCRIPTION OF THE INVENTION

Figure 1:
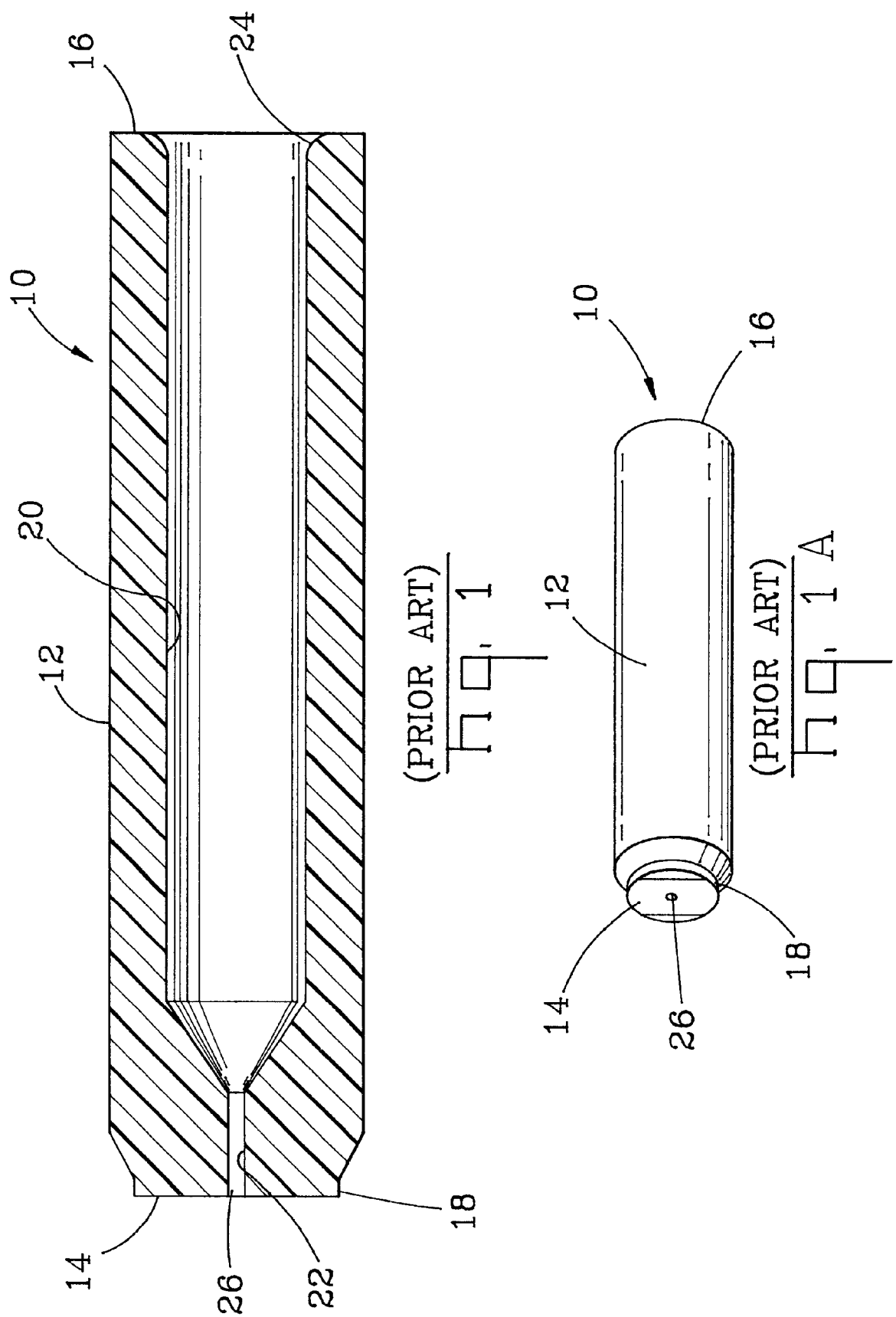
FIG. 1 is a cross-sectional side view of an exemplary polymer ferrule used in fiber optic connections.
Figure 2:
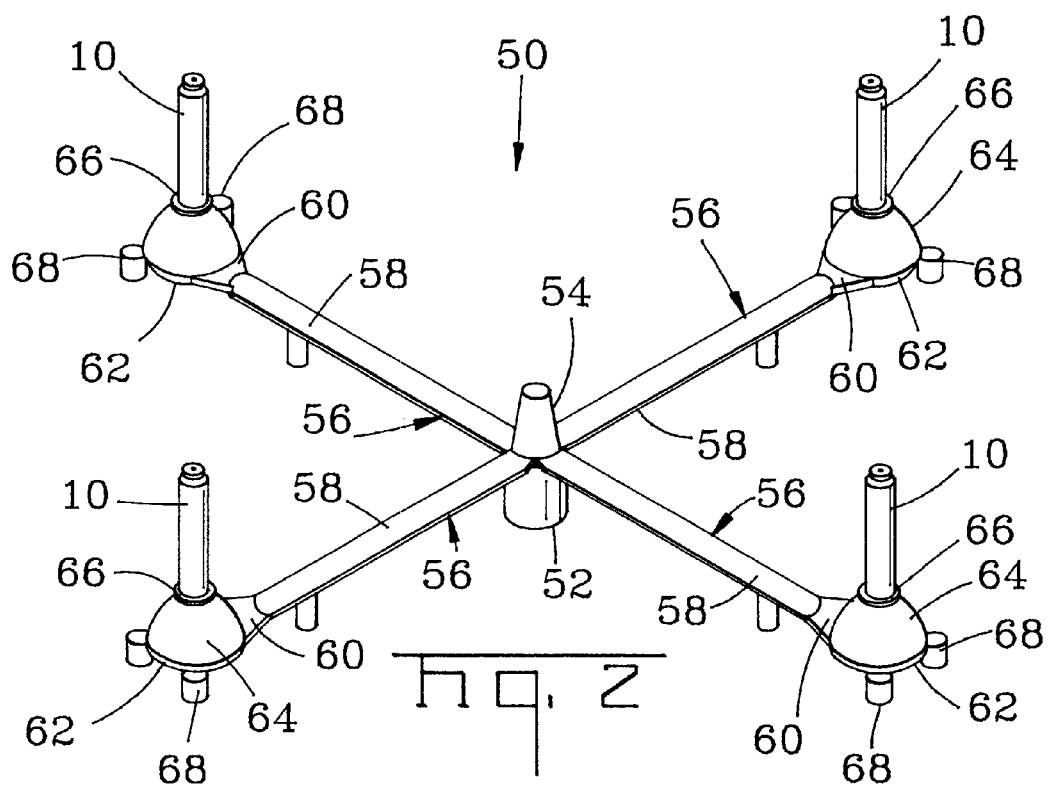
FIG. 2 is an isometric view of an exemplary molded part containing four molded ferrules.
Figure 2A:
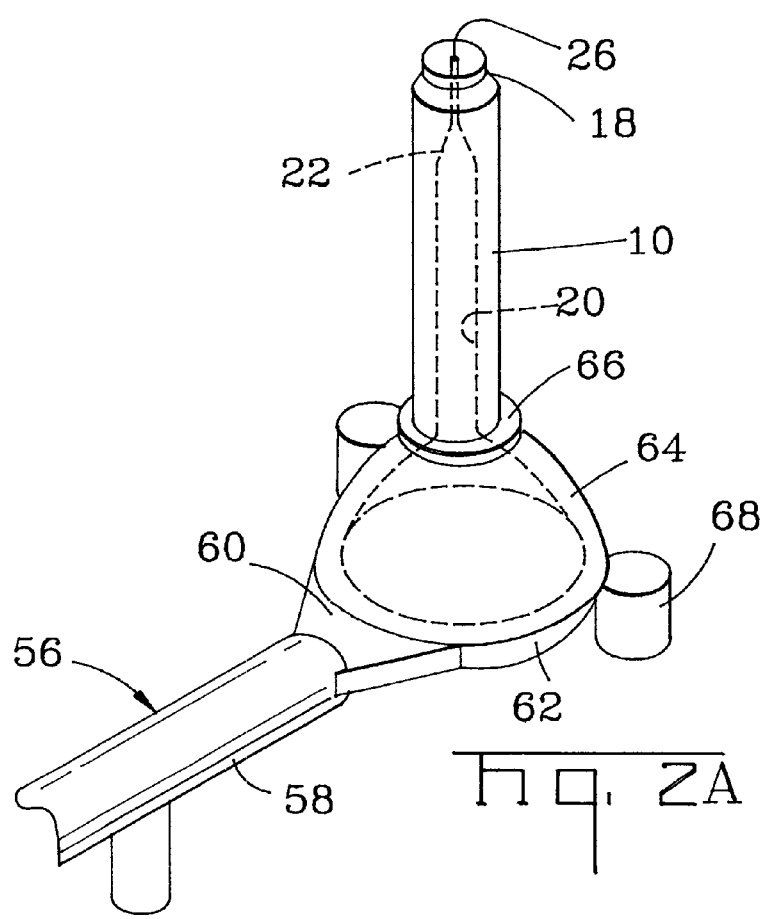
FIG. 2A is an enlarged isometric view of a portion of the molded part depicted in FIG. 2.

Referring to FIGS. 2 and 2A, there is shown an exemplary polymer part 50 that is formed using the injection molding devices and processes that will be described shortly. The polymer part 50 is a single molded piece that yields four ferrules 10 of the type depicted in FIGS. 1 and 1A. The remaining portion of part 50 is discarded.

The part 50 is unitarily molded and includes a central hub 52 with an upstanding conical spire 54 arising therefrom. Four arms 56 radiate outwardly from the hub 52 at approximate 90° angles from one another. Each of the arms 56 carries a single ferrule 10. Each arm 56 includes a cylindrical runner 58 that is affixed to the central hub 52 and terminates in a fan portion 60, which can be seen more clearly in FIG. 2B. The fan portion 60 has a reduced height, as compared to the runner 58, and, in the horizontal dimension, expands radially in the manner of a fan. The fan portion 60 is affixed to an annular ring portion 62. A base portion 64 having an outer surface substantially in the shape of a conic parabola or a hollow dome is affixed atop the ring portion 62 and tapers to a reduced diameter support platform 66 that carries the ferrule 10. FIG. 2A shows the ferrule-carrying portion of a single arm 56 in greater detail. As can be seen, the ring and parabola portions 62, 64 are hollow, forming a space or chamber 70 beneath.

After the part 50 is formed and cooled, the ferrules 10 may be snapped or cut off of the support platforms 66. It is pointed out that the part 50 also includes a number of knock-out tabs 68 that are useful in the molding process for ejecting the part 50 from its mold.

Referring now to FIGS. 3, 3A and 3B, an exemplary mold 100 is shown that is used to form the part 50. The mold 100 is designed to be used within an injection molding assembly of a type known in the art. The mold 100 is basically formed by a pair of interengageable halves that are often referred to as "A-side" and "B-side" halves, 102, 104, respectively. Each of the mold halves 102, 104 includes a substantially rectangular plate and a number of inserts that fit within apertures in the plate. FIG. 3B provides a simplified bottom view of an A-side plate 106 in order to illustrate the general layout of some of the exemplary mold components.

It will be understood that injection molding plates include a number of features such as thermal couplings, heat tube fittings, side lock vents and oil channels that are well understood and, thus, will not be described in any detail here. The plate 106 for the A-side half 102 includes four guide post bushings 108 that extend through the thickness of the plate 106 and are sized and shaped to receive guide posts 110. The central portion of the upper plate 106 contains a hardened sleeve 112 that is disposed through the thickness of the plate 106 and defines an upwardly-facing receptacle 114 into which a nozzle 116 is disposed for the injection of molten plastic. The receptacle 114 contains a fitting 118 upon which the nozzle 116 is received. The fitting 118 defines a plastic flow passage 120 into which molten plastic is injected under pressure from the nozzle 116. The preferred molten plastic material is a fiberglass-filled thermoset plastic material named Radel B available from RTP located in Winona, Minn.

The lower, or B-side, mold half 104 also includes a plate 122 that is shaped and sized to be generally complimentary to the upper plate 106. The lower plate 122 retains four guide post bases 124 from which the guide posts 110 extend upwardly into the guide post bushings 108 of the upper plate 106. A pin 123 is retained within the central portion of the plate 122. The upper portion of the pin 123 presents a horizontal surface 125 from which four semicylindrical channels 127 extend toward the lower plate's insert apertures 152.

The mold halves 102, 104 can be moved toward each other for engagement (as shown in FIG. 3) or apart from one another for removal of a molded piece, and the disposal of the guide posts 110 within the guide post bushings 108 ensures that the mold halves 102, 104 remain properly aligned with one another as this occurs.

The upper and lower mold halves 102, 104 also each include mold inserts that are retained within the plates 106, 122. Upper, or A-side, mold inserts 126 are disposed within apertures 128 in the upper plate 106. As FIG. 3B shows, the insert apertures 128 are interconnected with the central flow passage 120 via semicylindrical channels 129.

Figure 4:
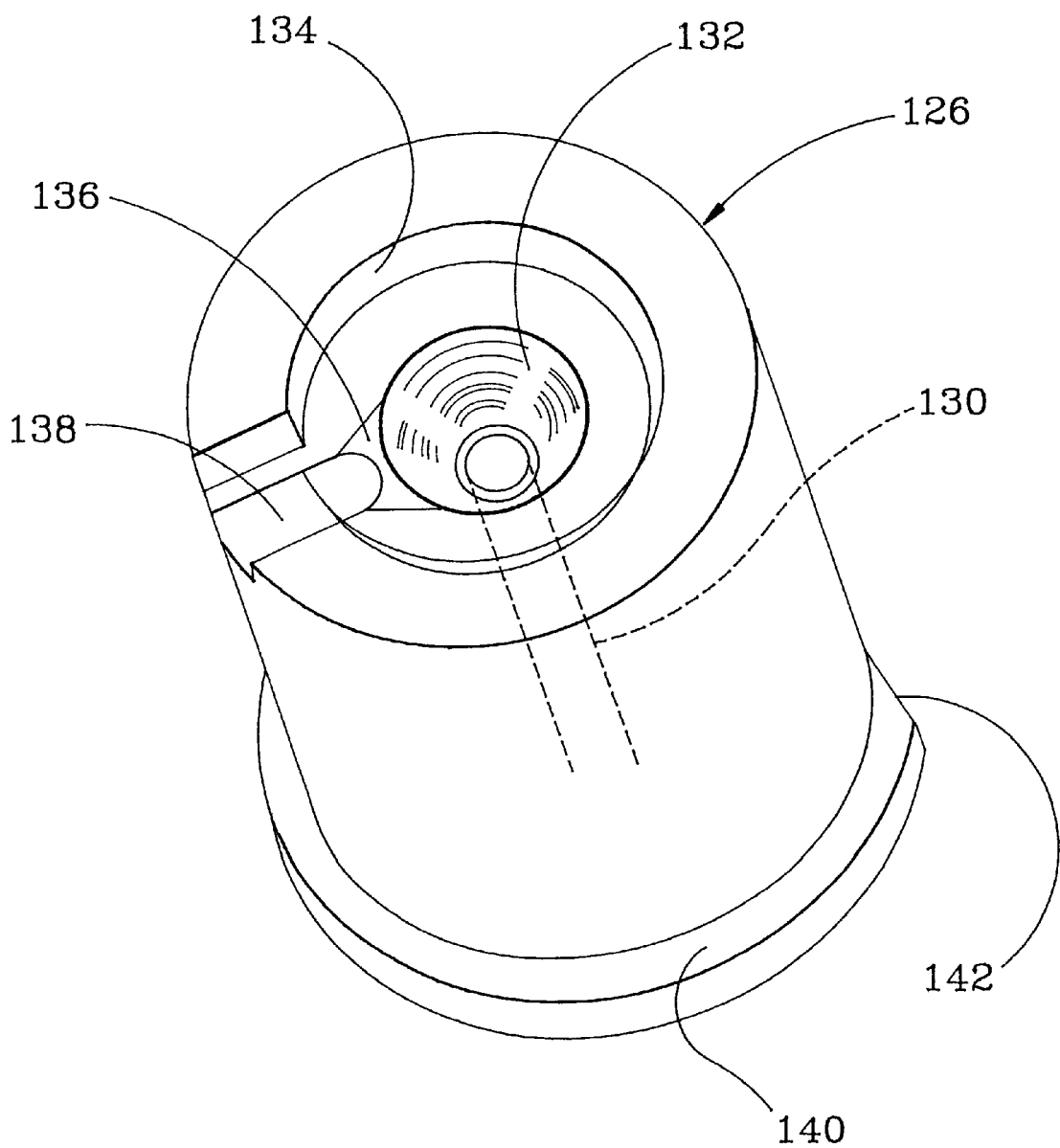
FIG. 4 is an isometric view of an exemplary A-side mold insert.
Figure 7:
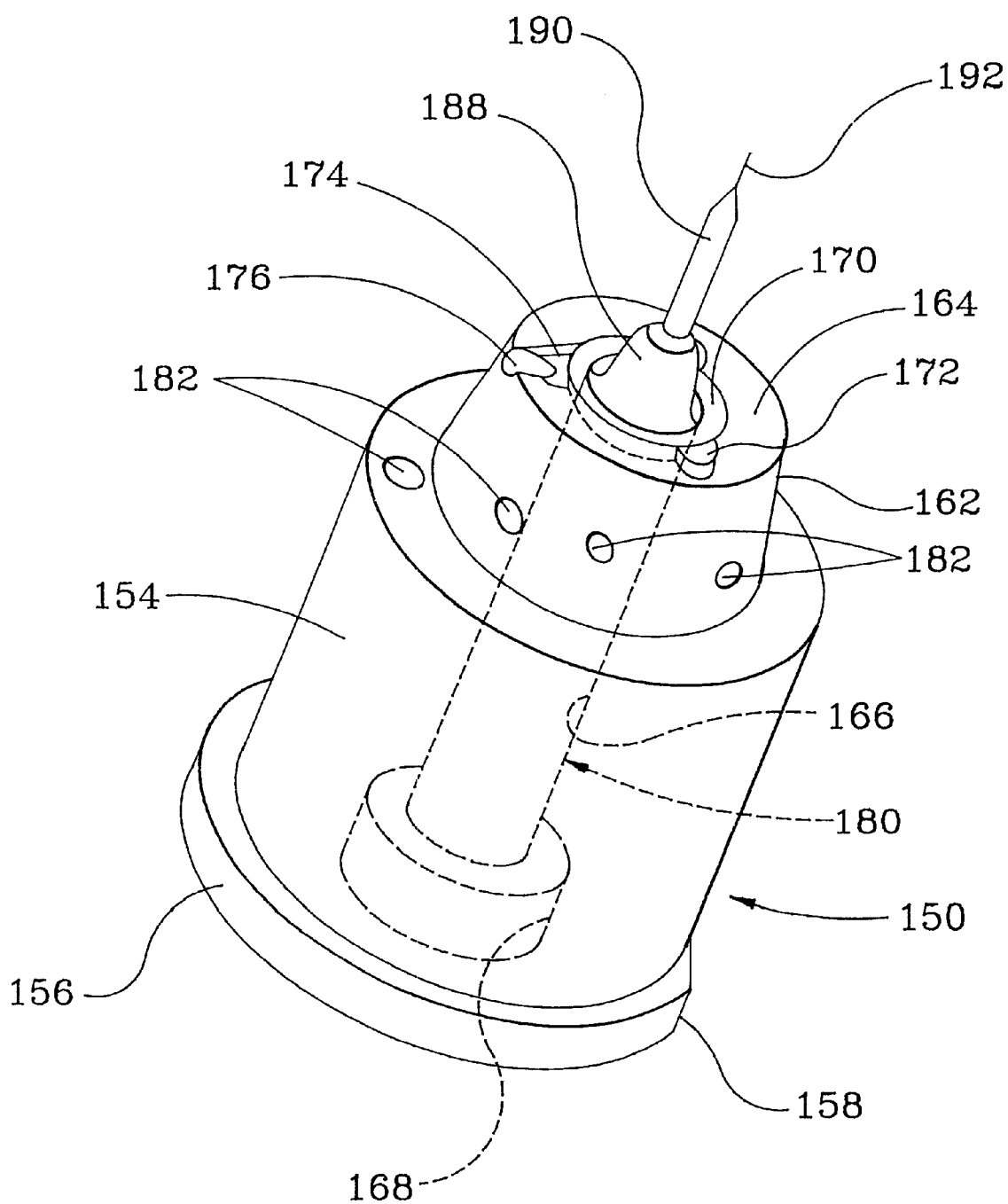

The four upper mold inserts 126 (only two shown) are substantially cylindrical in shape and define a vertical bore 130 therethrough. FIG. 4 provides an isometric view of one such insert 126 as viewed substantially from its lower end. As can be seen, the lower end of the vertical bore 130 adjoins a chamber surface 132 that is shaped substantially as a conic parabola. Surface 132 tapers and converges in an upward direction. An engagement lip 134 surrounds the chamber surface 132. As best shown in FIG. 4, a flattened fan-shaped recess 136 extends radially outwardly from the chamber surface 132. A rounded semicylindrical channel 138 adjoins the fan-shaped recess 136 and extends radially outward. The fan-shaped recess 136 converges in a radial outward direction from the axis of mold insert 126.

It is noted that the circumferential exterior of the upper end of the A-side insert 126 provides a radially outward-extending annular flange 140 that is used to engage a matching groove (141 in FIG. 3) in the upper mold plate 106. One side of the flange 140 is flattened at 142 and fits within a complimentary flattened portion (not shown) of the groove 141 so as to provide a keying arrangement with the mold plate 106. The keying arrangement 130 ensures that the insert 126 is properly oriented when inserted into the plate 106.

The lower, or B-side, mold inserts 150 are disposed in insert apertures 152 in the B-side plate 122 (FIG. 3). An exemplary B-side insert 150, as viewed substantially from its upper end and side, is shown in an isometric view in FIG. 5. The B-side insert 150 includes a generally cylindrical body 154 having a radially extending annular flange 156 at its lower end. The flange 156 includes a flattened portion 158. The flange 156 fits within a complimentary groove 160 in the lower plate 122, and the flattened portion 158 fits within a complimentary flattened portion (not shown) of the groove 160 to provide a keying arrangement that ensures correct orientation of the insert 150 within the aperture 152.

Extending upwardly from the body 154 of the B-side insert 150 is a platform 162 that has a conical sidewall and a substantially flat upper surface 164. A central bore 166 extends longitudinally through the platform 162 and the body 154. The bore 166 has a radially enlarged portion 168 at its lower end.

A ring groove 170 is disposed within the flat surface 164 of the platform 162 and surrounds the bore 166. One or more knock-out tab molding chambers 172 may be formed along the circumferential exterior of the ring groove 170. A flattened fan-shaped recess 174, having the same configuration as the fan-shaped recess 136 on the A-side insert 126, adjoins the ring groove 170. Recess 174 converges in a radially outward direction. A rounded semicylindrical channel 176, having the same configuration as the channel 138 of the A-side insert 126, adjoins the recess 174 and extends radially to the edge of the upper surface 164.

Figure 5A:
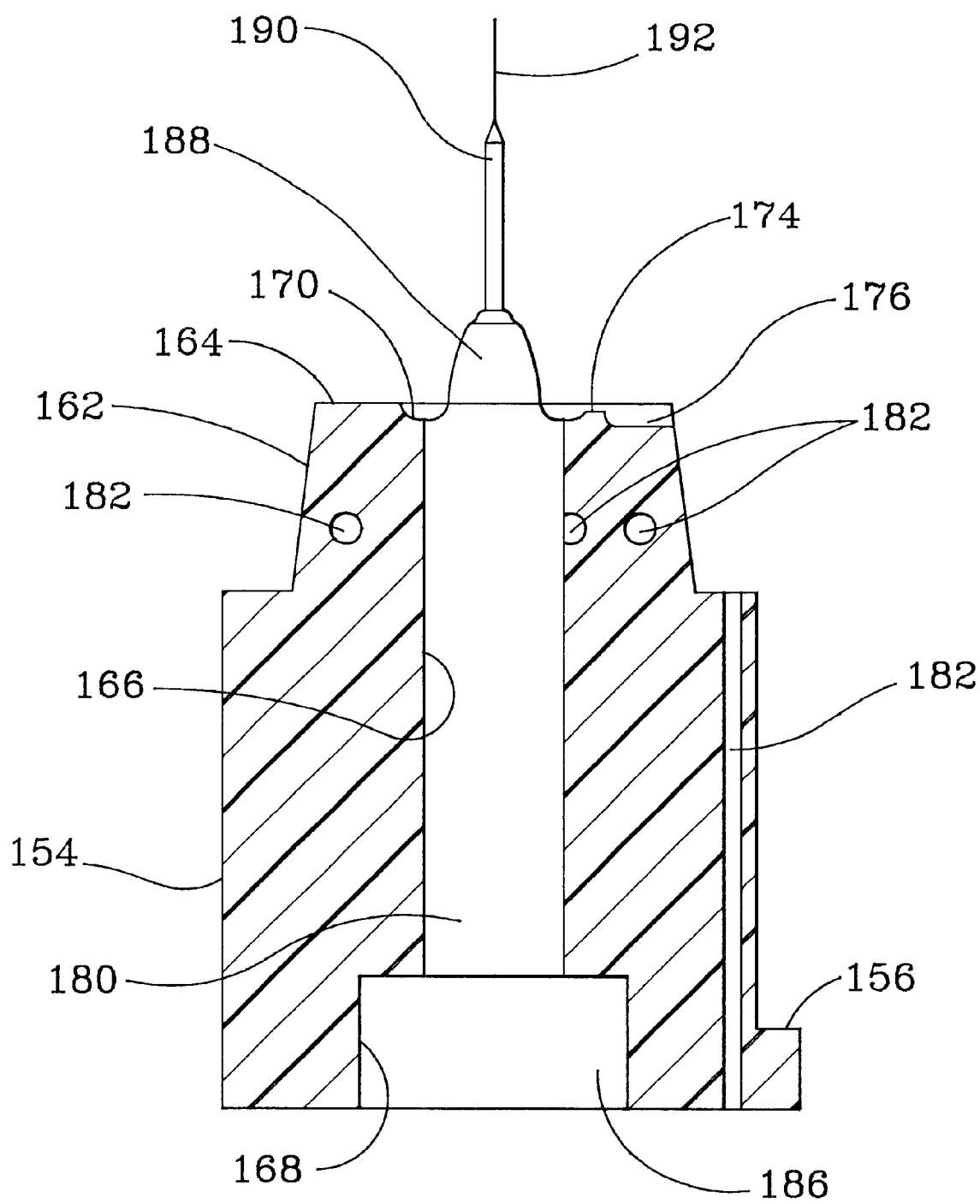
FIG. 5A is a partial cutaway view of the B-side mold insert and core pin assembly shown in FIG. 5.
Figure 6:
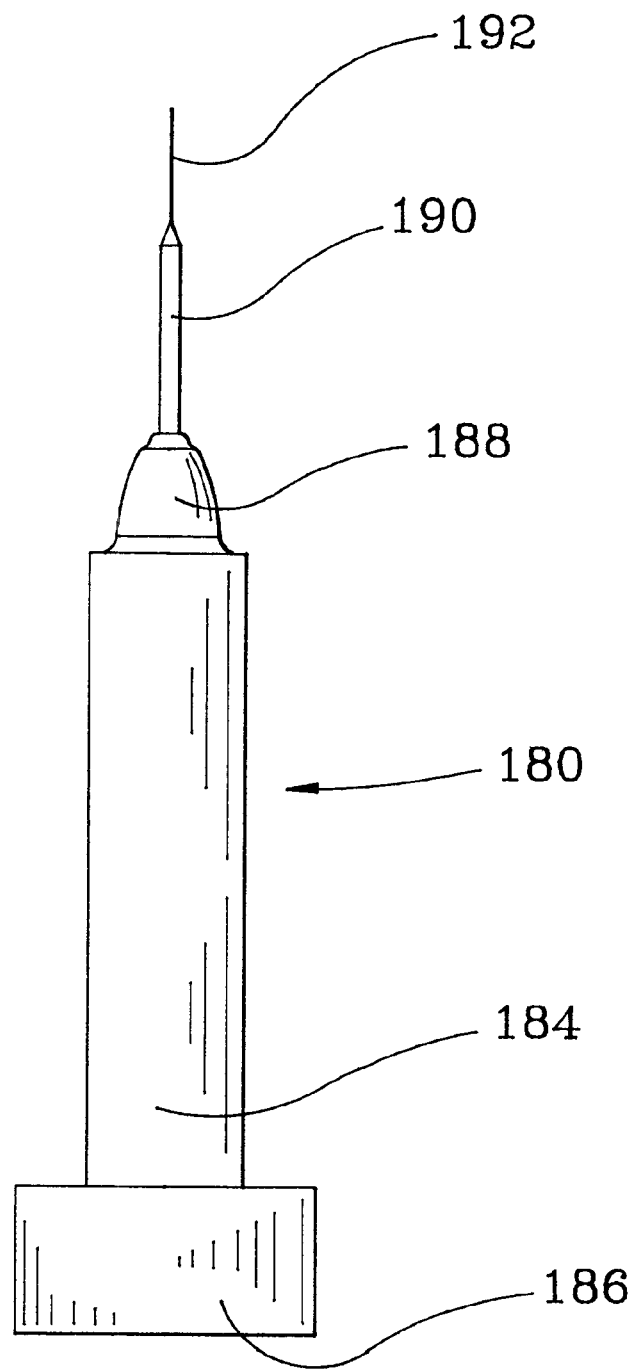
FIG. 6 depicts an exemplary core pin assembly used in the mold of FIG. 3.

A core pin assembly 180 is disposed within the bore 166 and enlarged bore portion 168 of each lower mold insert 150, as best shown in FIG. 5. An exemplary core pin assembly 180 is also shown apart from the lower mold insert 150 in FIG. 6. One or more assembly pins (not shown) may be inserted into pin holes 182 in the lower mold insert 150 in order to retain the core pin assembly 180 in place.

The core pin assembly 180 features a narrow solid cylindrical body 184 with an enlarged cylindrical base 186. The upper end of the body 184 presents a tapered conical portion 188 that supports an upstanding narrowed core pin 190. The upper end of the core pin 190 retains a gage wire 192 in a vertical orientation. Gage wire 192 is very small in diameter for forming bore 26 (FIG. 1). Uneven flow distribution of the molten plastic can cause lateral deflection of the gage wire 192, resulting in a misaligned bore 26.

When the mold halves 102, 104 are mated, as shown in FIGS. 3 and 3A, a number of molding passages and cavities are formed that permit molding of the plastic part 50. Four cylindrically shaped channels 200 (two shown in FIG. 3) extend outwardly from the flow passage 120 at about 90 degree angles from one another. It is noted that each channel 200 is formed by the mating semicylindrical halves 129, 127 of the A-side and B-side plates 102, 104 and the semicylindrical halves 138, 176 of the A-side and B-side inserts 106, 122.

Each of the channels 200 terminates at a flattened, or reduced height, fan gate 202 that is best shown in FIG. 3A. The fan gate 202 is defined by mating of the fan-shaped recesses 136 (FIG. 4) and 174 (FIG. 5) of the A-side and B-side inserts 106, 122. As will be appreciated by reference to FIGS. 4 and 5, the fan gate 202 diverges angularly in the horizontal dimension, in the manner of a fan, widening out as it approaches conical portion 188 of core pin assembly 180. Fan gate 202 slows the velocity of injected plastic and evenly distributes the plastic.

Referring again to FIG. 3A, a ring gate 204 adjoins the fan gate 202 and annularly surrounds the lower end of the tapered portion 188 of the core pin assembly 180. The ring gate 204 is essentially an annular trough that is defined by the ring groove 168 and the tapered portion 188 of the core pin assembly 180. The wider end of the fan gate 202 joins ring gate 204. Ring gate 204 causes the molten plastic to flow around the tapered portion 188 of the core pin assembly 180 before flowing upward.

Parabolic gate 206 is a chamber that extends upwardly from the ring gate 204, being formed between the parabolically-shaped chamber surface 132 of the A-side insert 126 above, and the tapered surface 188 of the core pin assembly 180 below. It is noted, with reference to FIG. 3A, that the parabolic gate 206 narrows and becomes more restrictive toward its upper end. Fan gate 202 is much shorter in height that parabolic gate 206. The radial dimension or thickness between the core pin tapered section 188 and the parabolic surface 132 decreases toward the upper end of the parabolic gate 206. Parabolic gate 206 serves to cause the molten plastic flowing upward from ring gate 204 to flow evenly.

A ferrule molding cavity 210 is formed between the core pin 190 and the bore 130 of the A-side insert 126. The molding cavity 210 opens at its lower end into the reduced diameter portion 208 of the parabolic gate 206. A ceramic plug 212 is fitted within the bore 130 and has an axial passage for receiving the gage wire 192 therein. The plug 212 provides an upper limit to the molding cavity 210.

It will be understood that the ferrule molding cavity 210 is the portion of the mold 100 that forms a ferrule 10 of the type shown in FIGS. 1 and 1A. The first bore 20 of the ferrule 10 is formed about the core pin 190 while the second bore 26 of the ferrule 10 is formed around the gage wire 192 below the plug 212.

During a molding operation, heated polymeric material (not shown) is flowed through the nozzle 116 into the mold 100 under pressure. The polymer flows down through the central passage or chamber 120, and from there it spreads radially outwardly through each of the channels 200.

Upon leaving each of the channels 200, the polymer enters the fan gate 202, which distributes or spreads the molten material horizontally into the ring gate 204. The reduced height of the fan gate 202 promotes controlled laminar flow of the molten material into the ring gate 204.

The ring gate 204 receives molten plastic from the fan gate 202 and distributes it annularly about the tapered portion 188 of the core pin assembly 180. The ring gate 204 thus fills and accumulates the molten plastic in an annular configuration. The molten plastic then rises into the lower end of the parabolic gate 206 so that it will flow around core pin tapered section 188, as will be understood from reference to FIG. 3A.

Flow of the plastic material becomes more restricted by the narrowing width and thickness of parabolic gate 206 at its upper end. The flow restriction of the parabolic gate 206 causes the molten material to enter the molding cavity 210 under increased pressure. It is noted that the ring gate 204 and parabolic gate 206 also serve to accumulate the molten material momentarily before permitting it to flow into the molding cavity 210. The annular configuration of the ring gate 204 and the parabolic gate 206, along with the accumulation function, ensure that the molten material will be substantially evenly distributed about the circumference of the tapered surface 188 prior to entry of the molten material into the cylindrical molding cavity 210. This helps ensure that the molten material is injected in a relatively even annular distribution about the core pin 210 upon entry into the molding cavity 210. This reduces the chance for the very thin gage wire 192 to become laterally displaced due to uneven plastic flow. After curing, the mold halves 102, 104 separate and molded part 50 is ejected.

In practice, the molding system of the present invention has resulted in greatly improved plastic flow patterns and a much lower failure rate for molding operations. The combination of the particular gates described herein results in optimum flow conditions for molten molding materials such as plastics and polymers, particularly where small precision parts such as ferrules are to be molded. The unused portion of the molded part is less in weight than prior art molded parts. The molding cycle time is also faster than prior art cycling times.

While the invention has been shown or described in only some of its forms, it should be apparent to those skilled in the art that it is not so limited, but is susceptible to various changes within departing from the scope of the invention.

What is claimed is:

1. An injection mold for forming a molded part having a tubular portion, comprising:
 a mold housing defining a flow path for molten molding material between an entry point and a molding chamber;
 a core pin located within the molding chamber defining an elongated annular cavity for forming the tubular portion of the molded part; and
 the flow path comprising:
  a channel in flow communication with the entry point;
  a substantially fan-shaped gate in flow communication with the channel; and
  an annular tapered gate in flow communication with the fan-shaped gate channel and the molding chamber, the annular tapered gate having an annular configuration for accumulating molten molding material from the channel through the fan-shaped gate.

2. The mold of claim 1 further comprising a ring-shaped gate within the flow path between the fan-shaped gate and the annular tapered gate to receive molten molding material from the fan-shaped gate and transmit the material into the annular tapered gate.

3. The mold of claim 2 wherein the annular tapered gate has a tapered inner surface and a generally parabolically-shaped outer surface.

4. The mold of claim 1 wherein the annular tapered gate has tapered inner and outer surfaces and wherein a radial thickness between inner and outer surfaces decreases in a direction toward the elongated annular cavity.

5. The mold of claim 1 wherein the elongated annular chamber is substantially cylindrical in shape.

6. The mold of claim 1 further comprising a gage wire protruding from the core pin along an axis of the core pin for defining a passage in an end of the tubular portion.

7. The mold of claim 1 wherein the core pin has an axis, the elongated tape red gate is coaxial with the core pin, and the fan gate has a lesser axial height than the tapered gate.

8. The mold of claim 1 wherein the mold housing comprises a pair of interengageable portions, each of the portions having recesses that cooperate to form the fan-shaped gate and elongated tapered gate.

9. An injection mold for forming a molded part having a tubular portion, comprising:
 a mold housing defining a mold path for molten molding material between an entry point for said molten molding material and a molding chamber;
 a pin assembly, said pin assembly being disposed in said mold for forming said molded part; and the mold housing defining an annular tapered gate, said annular tapered gate being aligned with said pin assembly, and said annular tapered gate being located at the entrance of the molding chamber to accumulate molten molding material in prior to entry of the molten molding material into the molding chamber.

10. The mold of claim 9 wherein the mold housing further defines a substantially fan-shaped gate that receives molten molding material from the flow path and diverges toward the annular tapered gate.

11. The mold of claim 10 wherein the mold housing further comprises interengageable portions defining a ring-shaped gate to receive molten molding material from the fan-shaped gate and transmit the material into the annular tapered gate.

12. The mold of claim 9 wherein the annular tapered gate has tapered inner and outer surfaces and wherein a radial thickness between inner and outer surfaces decreases in a direction toward the elongated annular cavity.

13. A method for forming a molded part having a tubular portion, comprising the operations of:
transmitting a molten molding material into a substantially fan-shaped gate which diverges to spread the molten molding material;
transmitting the molten molding material from the fan-shaped gate into an annular tapered gate having a hollow chamber that converges from the fan-shaped gate and is formed by a tapered inner surface and a tapered outer surface; and
transmitting the molten molding material from the annular tapered gate into an elongated annular chamber to form the tubular portion.

14. The method of claim 13 wherein the operation of transmitting the molten molding material from the fan-shaped gate into the annular tapered gate comprises accumulating molten molding material from the fan-shaped gate within an annular ring-shaped gate, and then transmitting the molten molding material from the ring-shaped gate into the annular tapered gate.

15. The method of claim 13 wherein the operation of transmitting a molten molding material into a substantially fan-shaped gate further comprises flowing molten molding material, under pressure, through an entry point, along a substantially cylindrical channel and then into the fan-shaped gate.

16. A molded part comprising:
a hub;
at least one arm radially extending from the hub, the arm having a ferrule-carrying portion upon which a ferrule is affixed;
the ferrule-carrying portion comprising a base that is coaxial with the ferrule and having an outer surface shaped generally as a conic parabola;
a fan-shaped section between the base and the arm; and
wherein the ferrule is severable from the base.

17. The molded part of claim 16 further comprising a ring-shaped member affixed to an end of the base opposite the ferrule.

18. The molded part of claim 15 wherein the base defines a space beneath.

19. The molded part of claim 15 wherein there are four of the arms and four of the ferrule-carrying portions.

* * * * *

UNITED STATES PATENT AND TRADEMARK OFFICE
CERTIFICATE OF CORRECTION

PATENT NO.    : 6,488,413 B1                                        Page 1 of 1
DATED         : December 3, 2002
INVENTOR(S)   : Xiao Yang Wan It is certified that error appears in the above-identified patent and that said Letters Patent is hereby corrected as shown below:

<u>Column 6,</u>
Line 55, delete "tape red", and add -- tapered --

Signed and Sealed this

Eighth Day of April, 2003

JAMES E. ROGAN
*Director of the United States Patent and Trademark Office*